(12) United States Patent
Turatti

(10) Patent No.: US 7,955,631 B2
(45) Date of Patent: Jun. 7, 2011

(54) PROCESS FOR WASHING AND STERILIZING FOOD PRODUCTS, PARTICULARLY VEGETABLES, AND RELEVANT APPARATUS

(75) Inventor: Antonio Turatti, Cavarzere (IT)

(73) Assignee: Turatti S.p.A., Cavarzere (IT)

( * ) Notice: Subject to any disclaimer, the term of this patent is extended or adjusted under 35 U.S.C. 154(b) by 640 days.

(21) Appl. No.: 11/555,879

(22) Filed: Nov. 2, 2006

(65) Prior Publication Data

US 2007/0212457 A1    Sep. 13, 2007

(30) Foreign Application Priority Data

Mar. 8, 2006    (IT) .............................. RM2006A0118

(51) Int. Cl.
*A23L 3/28*    (2006.01)
(52) U.S. Cl. ......... 426/238; 426/248; 426/320; 426/335
(58) Field of Classification Search .................. 426/237, 426/238, 248, 320, 324, 326, 333, 335, 392, 426/418, 419, 455, 456, 490, 495
See application file for complete search history.

(56) References Cited

U.S. PATENT DOCUMENTS

| | | | | |
|---|---|---|---|---|
| 4,237,782 A | * | 12/1980 | Bichel | 99/625 |
| 4,827,727 A | * | 5/1989 | Caracciolo | 62/63 |
| 4,840,823 A | * | 6/1989 | Chigami et al. | 428/35.5 |
| 4,879,127 A | * | 11/1989 | Liu et al. | 426/325 |
| 5,322,623 A | * | 6/1994 | Benskin et al. | 210/195.1 |
| 5,927,304 A | * | 7/1999 | Wen | 134/153 |
| 6,171,548 B1 | * | 1/2001 | Rose et al. | 422/20 |
| 6,348,227 B1 | * | 2/2002 | Caracciolo, Jr. | 426/332 |
| 6,749,875 B2 | * | 6/2004 | Selleck | 426/270 |
| 6,852,295 B2 | * | 2/2005 | Hung | 422/292 |
| 7,160,566 B2 | * | 1/2007 | Fink et al. | 426/235 |
| 7,258,882 B2 | * | 8/2007 | Hankinson et al. | 426/234 |
| 7,601,376 B2 | * | 10/2009 | Stanley | 426/248 |
| 2004/0052702 A1 | * | 3/2004 | Shuman et al. | 422/208 |
| 2004/0175476 A1 | * | 9/2004 | Kross | 426/532 |
| 2006/0110280 A1 | * | 5/2006 | Nelson et al. | 422/3 |
| 2007/0059410 A1 | * | 3/2007 | Steffen | 426/236 |

FOREIGN PATENT DOCUMENTS

| | | |
|---|---|---|
| JP | 10117948 A | 5/1998 |
| JP | 10174552 | 6/1998 |
| JP | 2002345400 A | 12/2002 |
| WO | WO 2004095953 A2 * | 11/2004 |
| WO | WO2004095953 A2 | 11/2004 |

* cited by examiner

*Primary Examiner* — Drew E Becker
(74) *Attorney, Agent, or Firm* — Gauthier & Connors LLP

(57) ABSTRACT

The present invention relates to a process for washing and sterilizing food products, particularly vegetables. The process comprises the following steps: (a) treatment of the food products by ultrasounds, ultraviolet rays and micro filtering; (b) treatment of the food products under ozone atmosphere, ultraviolet rays and micro filtering; (c) treatment of the food products by ultraviolet rays; and (d) dewatering and drying the food products under controlled atmosphere. The present invention further relates to an apparatus for carrying out the above process.

6 Claims, 1 Drawing Sheet

US 7,955,631 B2

PROCESS FOR WASHING AND STERILIZING FOOD PRODUCTS, PARTICULARLY VEGETABLES, AND RELEVANT APPARATUS

PRIORITY INFORMATION

This application claims priority to Italian Patent application No. RM2006A000118 filed on Mar. 8, 2006, which is incorporated by reference in its entirety herein

BACKGROUND OF THE INVENTION

1. Field of the Invention

The present invention relates to a process for washing and sterilising food products, particularly vegetables, and relevant apparatus.

More specifically, the invention concerns a process of the above kind, particularly studied and realised for realising an innovative vegetable products industrial washing line, permitting eliminating use of sodium hypochlorite without lowering safety hygienic standards or increasing drinkable water consumption.

2. Description of the Prior Art

As it is well known, many apparatuses or systems exist for washing vegetables, mainly in the industrial field.

Among these, it is possible mentioning some, such the described in patent application WO2004095953 A2, concerning a foodstuff disinfection process, said foodstuffs being washed in presence of ozone, oxygen, carbon hydroxide, argon, ultraviolet light, ultrasound, until reaching a vacuum step. Said process has the main advantage of carrying out a cold sterilisation.

Japanese patent application JP 2002345400 A describes an apparatus for maintaining vegetables, fruit and like freshness. Said apparatus comprises an ultraviolet irradiation unit within a containment chamber wherein a suitable atmosphere is maintained. Furthermore, said apparatus comprises a unit for humidification during ultraviolet irradiation, so as to generate ozone within said chamber. A suction unit removes ozone and ethylene produced during this step.

Japanese patent application JP 10174552 concerns a washing and disinfection process for fruit and/or vegetables, mainly comprising the following steps:

washing said fruit and/or vegetables within acid or alkaline water within a container, using at the same time ultrasound waves emitted by an ultrasound generator;

cutting said fruit and/or vegetables by cutting means under an oxidising gas atmosphere, such as ozone, ultraviolet radiation and vapour at a pressure lower than vapour saturation pressure;

packaging said cut fruit and/or vegetables by a packaging unit in presence of vapour or gas with nitrogen and carbon hydroxide at a pressure lower that vapour saturation pressure.

Finally, Japanese patent application JP 10117948 A concerns a process for washing fruit and vegetables, mainly comprising the steps of washing said fruit and/or vegetables in presence of ultrasounds, said ultrasounds being obtained by an ultrasound generator. Washed fruit and/or vegetables are then subjected to ultraviolet irradiation by germicide lamp, in order to obtain a sterilisation.

In order to make said ultraviolet irradiation, a reflector is included within a container. Finally, a container-cleaning device is provided.

Main problem of the above described systems, as well as of other similar known systems, is that the use sanifying products such as sodium hypochlorite, ozone, peroxides and like that, mixed in high concentration with washing water, permit limiting risks of bacterial pollution and ensure a good protection level against pollution of foodstuff by pathogen agents.

However, use of these products has been always more limited in the last years, mainly due to their toxicity. For example, starting from 2007 their use will be prohibited in Europe according to specific European Union rules.

On the basis of the present technology, these new limits will surely induce a high increase of water consumption and therefore a higher volume of outlets to be subjected to treatment, higher working costs and a remarkable environmental impact.

Another technical problem of the standard systems is that, as it is well known to those skilled in this field, by pasteurising and sterilisation techniques, some basic nutritional components are modified or even completely destroyed (e.g. vitamins).

SUMMARY OF THE INVENTION

In view of the above, it is object of the present invention that of suggesting a process permitting reduction of water consumption, elimination of outlets subjected to treatment, and at the same time reduction of power consumption, maintaining qualitative standards of the final product able ensuring a prolonged conservation under sterility conditions without employing sterilisation and pasteurising thermal processes.

Another object of the invention is that of reducing noise pollution and of improving working safety conditions.

A further object of the present invention is that of preserving organoleptic properties of foodstuffs subjected to treatment.

It is therefore specific object of the present invention a process for washing and sterilising food products, particularly vegetables, characterised in that it comprises the following steps:

(a) treatment of said food products in water by ultrasounds, ultraviolet rays and micro filtering the water;

(b) treatment of said food products in water under ozone atmosphere, ultraviolet rays and micro filtering the water;

(c) treatment of the food products by ultraviolet rays;

(d) dewatering and drying the food products under controlled atmosphere.

Furthermore, according to the invention, micro filtering treatment of step (b) can hold particles with a diameter lower than 30 microns.

Always according to the invention, said ultrasounds can have a frequency between 20 kHz and 40 kHz.

Still according to the invention, ozone treatment of step (b) can be realised by washing the products in ozone-saturated water.

Furthermore, according to the invention, said ozone saturated water can react with said ultraviolet rays, thus forming strong oxidising radicals, according to the following chemical reaction chain:

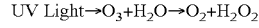

UV Light→$O_3$+$H_2O$→$O_2$+$H_2O_2$

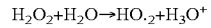

$H_2O_2$+$H_2O$→$HO_{·2}$+$H_3O^+$

Advantageously, according to the invention, drying of said foodstuff products can occur under a passivating airflow.

Preferably, according to the invention, above described step (d) can be carried out under controlled atmosphere.

Always according to the invention, said process can comprise a further step, carried out between said step (c) and said step (d), said further step providing treatment of food products by a calcium ascorbate natural solution, combined with vegetal nutrients physiological osmotic solution.

Still according to the invention, said calcium ascorbate solution and said vegetal nutrients physiological osmotic solution can be sprayed on said food products.

Furthermore, according to the invention, said process can comprise, after step (d) a step in which said food products are packaged within bag containers, a high humidity rate being maintained within said bag container by free water, thus preventing dehydration of said food products and retarding formation of ethylene, thus increasing food products shelf-life.

Advantageously, according to the invention, said process can provide a pre-washing and scrubbing step before said step (a).

It is further specific object of the present invention an apparatus for washing and sterilising food products, particularly vegetables, for carrying out the above described process, comprising loading means and means for discharging said food products, characterised in that it comprises a first section, including dragging means, a cavity within which said products are submerged in water, means for generation of ultrasounds, ultraviolet light emission means, micro filtering means and means for generation of ozone, said water contained within said cavity being saturated with ozone produced by said means for generation of ozone; and a second section comprising further dragging means, means for drying said food products and cooling means.

Furthermore, according to the invention, said micro filtering means can hold particles with a diameter lower than 30 microns.

Always according to the invention, said ultrasounds generation means can emit a frequency between 20 kHz and 40 kHz.

Still according to the invention, said first section can comprise means for jet injection of a calcium ascorbate natural solution, combined with vegetal nutrients physiological osmotic solution.

Furthermore, according to the invention, said first section can comprise means for collection of sediments deposited within said cavity.

Advantageously, according to the invention, said apparatus can comprise packaging means for said food products, maintaining said food products at a high humidity rate.

Preferably, according to the invention, said drying means can be comprised of a first tunnel.

Furthermore, according to the invention, said cooling means can be comprised of a second tunnel within which said food products are maintained under a nitrogen, or ozone, or nitrogen and ozone saturated atmosphere.

Advantageously, according to the invention, said apparatus can comprise water-purifying means, such as a decanter.

Still according to the invention, said dragging means can comprise conveyor belts.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION OF THE INVENTION

Figure 1:
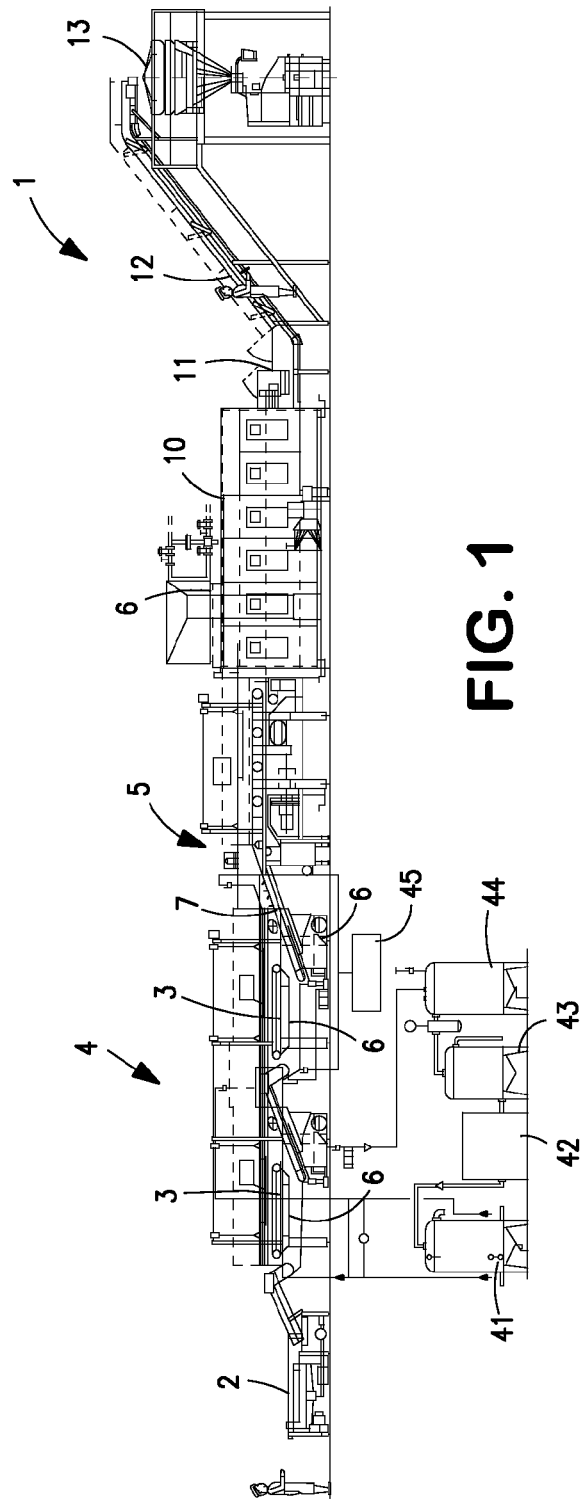
FIG. 1 shows a lateral view of an apparatus for carrying out the food products washing and sterilisation process according to the present invention.
Figure 2:
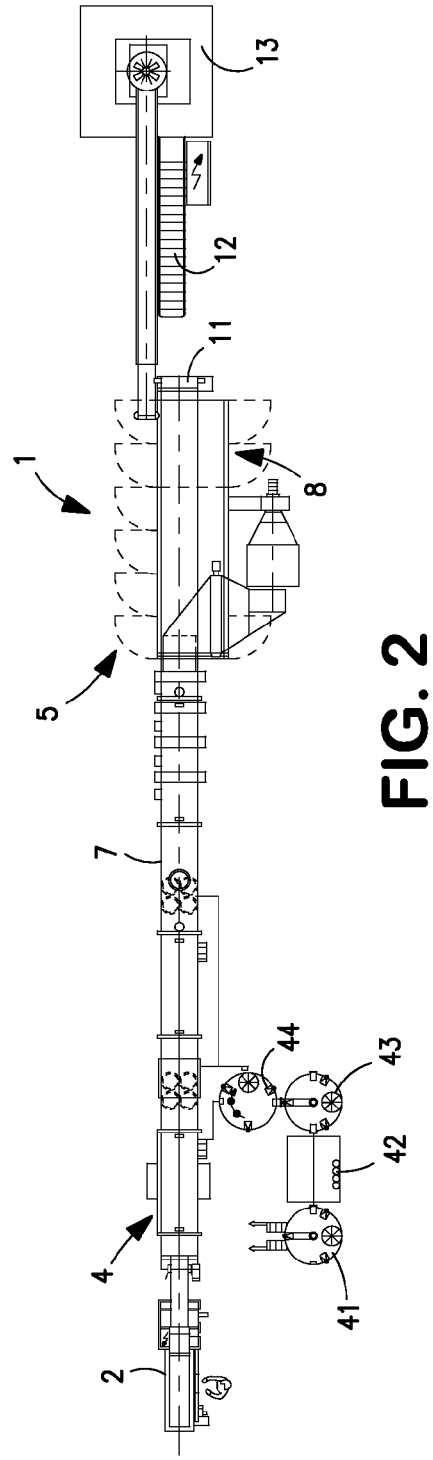
FIG. 2 shows a top view of apparatus of FIG. 1.

Process for washing and sterilising food products according to the present invention mainly comprises the following steps:

a) treating, at the same time, said food products by ultrasound waves, ultraviolet rays and micro filtration;

b) treating, at the same time, said food products under ozone atmosphere, ultraviolet rays and micro filtration;

c) treating, at the same time, said food products by ultraviolet rays;

d) dewatering and drying said food products under controlled atmosphere.

Making specific reference to the figures, it is possible observing apparatus 1 for carrying out washing and sterilisation process of food products according to the present invention described in the above.

Food products, in the specific case leaf vegetables, are loaded on a loading elevator 2, within a first section 4. Steps (a), (b) and (c) are carried out in said first section 4.

Preliminarily, said food products are subjected to pre-washing and scrubbing step, during which they are submerged within water contained. Then, they are subjected to ultrasound treatment and at the same time to ultraviolet light treatment.

Said ultrasounds, or ultrasound bath, have a frequency between 20 kHz and 40 kHz and they clean already cut products even within their smaller cavities. In fact, they destroy microbes or small pathogen agents by destruction of cellular membranes by friction force.

Ultraviolet light has the function of making microbes inefficient, preventing their reproduction.

Always in said first section 4, food products are injected within ozone ultrasonic bath (step (b)) said ozone being produced by ozone generation unit 45. It works as an oxidising catalyst along with the rays within the ultrasonic bath. Finally, they are again subjected to ultraviolet rays.

Sediments produces are collected in said first section 4.

Belts 6 move products in said section 4.

Second section 5, where food products, such as leaf vegetables and other type of vegetables, arrive by an elevator belt 7, provides washing the same vegetables within ozone saturated water, said ozone being produced by an autonomous ozone generator (not shown in the figures) along with ultraviolet rays and micro filtration (step (b)).

Said section 5 is a watertight section and exhausted air is discharged outside.

Ultraviolet rays, thus creating strong oxidating radicals according to the following chemical reaction chain, destroy water solution ozone:

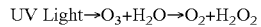

UV Light→$O_3$+$H_2O$→$O_2$+$H_2O_2$

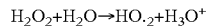

$H_2O_2$+$H_2O$→$HO._2$+$H_3O^+$

Presence pf oxidation is really stronger for disinfection with respect to the simple use of ozone, thus permitting reduction of microbes bigger that 6 log.

Then (step (c)), products are still subjected to the ultraviolet irradiation, acting as bactericide action.

This occurs while said food products are confined with respect to not sterile outside air, and are passed within ultraviolet ray sterilised water bath.

A micro filtration process treats washing water by a micro filtering unit 42, able holding particles having a diameter smaller than 30 microns. Water is first passed to a decanter 44, for purifying water. Then to a container 43 and to the micro filtration unit 42 and subsequently to a container 41. Finally, water is introduced back into the first line of the first section 4. Said treatment permits elimination of still present bacteria and virus from water.

Disinfection process according to the invention, by combined action of different active agents, permits destroying microbes and spore and thus reaching a product purity level that can be considered as a "product cold sterilisation".

Finally, at the end of the sterilisation process, they are subjected to treatment by a natural solution of calcium ascorbate, combined with vegetal nutrients physiological osmotic solution, using an air jet electrostatic spay technique.

Then, in third section 8, food products are dried within first tunnel 9 and cooled in nitrogen or ozone saturated atmosphere, or nitrogen and ozone saturated atmosphere, within second tunnel 10.

Products then reach a by-pass belt 11 and a further elevator belt 12, feeding a bag-packaging machine 13.

Passage between different sections must occur under controlled atmosphere in order to prevent every possible contamination. At the end of the process, products are dried and bacteria-free, aseptically packaged within bags or cups with a specially modified atmosphere.

Humidity of said food products can be maintained at high levels within the container or bag by a higher free water level, obtained from dehydration, thus retarding ethylene formation within the bag, thus permitting a perfect product visible and taste quality and thus remarkably increasing shelf-life.

Apparatus 1 has water consumption reduced at the half with respect to the existing systems, while energetic consumption is reduced of 15% with respect to similar apparatuses.

Water discharged within drain and containing chlorides and peroxides are annulled, thus remarkably reducing environment impact.

Sound pollution of working environment is reduced in view of the fact that machines are watertight. At the same time, it is increased operator safety.

On the basis of the previous description, it can be observed that main advantage of the present invention is increase of at least 50% of shelf-life.

An advantage of the present invention is that of maintaining nutritive properties of foods, maintaining technological and organoleptic properties of the product.

A further advantage of the invention is combined use of washing techniques described in the above permitting reduction of bacterial presence on products subjected to treatment, thus permitting a kind of "cold sterilisation"—and thus by mechanical methods and not by chemical methods—permitting at the same time a strong reduction of environmental impact of this productive cycle on natural elements used.

Finally saving is obtained since:
  it is obtained a reduction of water consumption of 50% with respect to known systems;
  it is obtained a reduction of power consumption of 10-15% with respect to known systems;
  it is obtained an elimination of outlets subjected to chemical reduction treatment of chlorides and peroxides (100%);
  it is obtained a reduction of noise level of machineries of 5-10%.

The present invention has been described for illustrative but not limitative purposes, according to its preferred embodiments, but it is to be understood that modifications and/or changes can be introduced by those skilled in the art without departing from the relevant scope as defined in the enclosed claims.

What we now claim is:

1. A process for washing and sterilising food products, wherein it comprises the following steps:
   (a) treatment of said food products in a first body of water by ultrasounds, ultraviolet rays and micro filtering said first body of water;
   (b) treatment of said food products in a second body of water under ozone atmosphere, ultraviolet rays and micro filtering said second body of water;
   (c) treatment of said food products by ultraviolet rays;
   (d) dewatering and drying said food products under controlled atmosphere wherein micro filtering treatment of step (b) can hold particles with a diameter lower than 30 microns; the ozone saturated water in steps (b) and (c) reacts under irradiation of said ultraviolet rays, thus forming strong oxidising radicals, according to the following chemical reaction chain:

$$O_3+H_2O \rightarrow O_2+H_2O_2$$

$$H_2O_2+H_2O \rightarrow HO_2+H_3O^+;$$

and further wherein said process comprises a further step, carried out between said step (c) and said step (d), said further step providing treatment of food products by a calcium ascorbate natural solution.

2. The process according to claim 1, wherein said ultrasounds have a frequency between 20 kHz and 40 kHz.

3. The process according to claim 1, wherein ozone treatment of step (b) is realised by washing the products in ozone saturated water.

4. The process according to claim 1 wherein drying of said foodstuff products occurs under a passivating air flow.

5. The process according to claim 1, wherein said calcium ascorbate solution is sprayed on said food products.

6. The process according to claim 1, wherein said process provides a pre-washing and scrubbing step before said step (a).

* * * * *